Patented July 28, 1953

2,647,152

UNITED STATES PATENT OFFICE 2,647,152

TERPENYLALKYLPHENOLS AND THEIR PREPARATION

Leland J. Kitchen, Akron, Ohio, assignor to The Firestone Tire & Rubber Company, Akron, Ohio, a corporation of Ohio No Drawing. Application July 12, 1950, Serial No. 173,489

4 Claims. (Cl. 260—619)

This invention relates to the terpenylalkylphenols and their production. This application is a continuation-in-part of my application Serial No. 653,426 filed March 9, 1946, and now Patent No. 2,537,636.

Terpenylalkylphenols are advantageously prepared by alkylation of terpenylphenols. The terpenylphenols are usually prepared by terpenylation of a phenol (which may be an alkylated phenol) with a terpene hydrocarbon in the presence of an acid catalyst, such as a strong acid, ferric chloride and like salts, siliceous earths, halogens, etc. The usual reaction products contain terpenyl ethers of phenols and terpene polymerization products admixed with the nuclearly terpenylated phenols. Substantially pure terpenylalkylphenols are preferred as non-discoloring stabilizers for natural and synthetic rubbers as well as for other uses. The invention includes the 2,4-dialkyl-6-terpenylphenols, which are new compositions of matter, and methods of obtaining them substantially free from side reaction products.

In general, steric hindrance prevents the inclusion of a terpenyl group and two large alkyl groups in the same 2,4-dialkyl-6-terpenylphenol. The commercial compounds of this type will, therefore, probably be limited to those compounds with alkyl substituents containing no more than five carbon atoms, and these are the preferred compounds of this invention. The preferred compounds of this type are the 2,4-dialkyl-6-isobornyl-, and fenchyl-phenols. According to the process of this invention, the 2,4-dialkyl-6-terpenylphenols are obtained by condensation of a 2,4-dialkylphenol with a suitable terpene hydrocarbon in the presence of an acidic catalyst while heating at a temperature of about 70 to 130° C., preferably with subsequent extraction of the reacted mixture with an alkali metal base to remove unreacted phenol.

Most of the 2,4-dialkylphenols used in preparing the compounds of this invention are soluble in water solutions of alkali metal bases. The 2,4-dialkyl-6-terpenylphenols are insoluble or relatively insoluble in these reagents. Treatment with an alkali metal hydroxide solution, therefore, affords a valuable method of separating from the desired dialkylterpenylphenol any excess or unreacted 2,4-dialkylphenol used in its preparation.

The 2,4-dialkylphenols used as starting materials include those in which the alkyl groups are any of the following or a combination of any of the following: methyl, ethyl, propyl, isopropyl, n-butyl, sec-butyl, isobutyl, tert-butyl or any of the various amyl groups. In general, larger alkyl groups are excluded from the invention, particularly those in the ortho position, because through steric hindrance there is a tendency of the larger alkyl groups to prevent reaction of the nuclear carbons of the phenols with the terpene groups. The 2,4-dimethylphenol is preferred for carrying out the reaction not only because it reduces steric hindrance to a minimum but also because it is more readily soluble in alkali metal hydroxides than some of the other starting materials indicated above.

In the case of a terpene wherein there are double bonds in conjugation, or a monocyclic terpene capable of isomerizing to a conjugated terpene, it is possible for the yield of 2,4-dialkyl-6-terpenylphenol to be reduced by chroman formation. Therefore stably bicyclic terpenes and tricyclic terpenes are preferred over the acylic terpenes and the monocyclic terpenes.

The terpenes preferred for commercial operations because of their availability are camphene and tricyclene. Other bicyclic terpenes which may be used include the fenchenes, and bornylene. Tricyclic terpenes—for instance, tricyclene and cyclofenchene—may be used as terpene starting materials even though they contain no unsaturated linkages.

The acidic catalysts which may be used in carrying out the process include, for example, such well-known catalysts as sulfuric acid, phosphoric acid, benzenesulfonic acid, p-toluenesulfonic acid, stannic chloride, zinc chloride, aluminum chloride, fluoboric acid, hydrofluoric acid, ferric chloride, and the boron trihalides, such as boron trichloride, boron trifluoride, and their ether complexes. A few per cent by the weight of the catalyst is usually sufficient to give the desired reaction.

Boron trifluoride and benzenesulfonic acid are generally preferred for use as catalysts. Sulfuric acid tends to cause undesirable side reactions, such as sulfonation, oxidation, and polymerization particularly at higher temperatures so that when this catalyst is used, a temperature not higher than 80° C. will ordinarily be preferred to minimize the side reactions. Boron trifluoride-ether complex in the higher temperature range—for example, from 110° to 130° C.—is usually considered objectionable in catalytic reactions and should usually be avoided in the production of the compounds of this invention because of its tendency to be removed from the reaction mixture and deposited on the walls of the condenser.

At temperatures above 130° C. there is a tendency for the terpenes to undergo undesirable side reactions, such as isomerization and polymerization. Therefore, in carrying out the condensation, a temperature of about 70° to about 130° C. will be employed.

In carrying out the reaction, equimolecular proportions of the dialkylphenol and terpene hydrocarbon may be used although the ratio may be altered widely in favor of either reactant. It usually is desirable to use an excess of the dialkyl phenol if it is readily extractable from the reaction mixture by a base, such as an alkali metal hydroxide.

It frequently is desirable to have a diluent present during the reaction in order to facilitate agitation during the condensation reaction and to aid in the working up of the reaction mixture by lowering its viscosity, since the 2,4-dialkyl-6-terpenylphenols are highly viscous liquids when in the liquid state. Diluents which may be used satisfactorily include benzene, toluene, ethylene chloride, and cyclohexane.

The 2,4-dialkyl-6-terpenylphenols usually are obtained as highly viscous liquids having a refractive index of about 1.52–1.54 ($n_D$) and a boiling point of at least 190° C. at a pressure of 10 millimeters of mercury.

EXAMPLE 1

2,4-dimethyl-6-isobornylphenol

Equimolecular amounts of camphene and 2,4-dimethylphenol (272 grams of camphene and 244 grams of 2,4-dimethylphenol) were dissolved in 300 milliliters of diluent toluene; and 8 grams of catalyst, 70 per cent benzenesulfonic acid, were added. The mixture was heated at 129–130° C. for nine and one-half hours, then partially cooled, shaken once with about 500 milliliters of 10 per cent NaOH solution, and distilled, using a Raschig-ring packed column with an efficiency of about five theoretical plates. Toluene was distilled from the reacted mixture at atmospheric pressure; and camphene and dimethylphenol were then distilled at 17 millimeters, then 10 millimeters. The recovered camphene and dimethylphenol along with the dimethylphenol obtained by acidification of the caustic washings amounted to 55 per cent of the weight of the starting reactants.

After collecting an 11-gram fore-run, 174 grams of 2,4-dimethyl-6-isobornylphenol were obtained as a highly viscous liquid with a light yellow tinge, boiling in the range 184–195° C. at 10 millimeters; it had $n_D^{22}$=1.5396. Seven grams of residue remained in the still-pot.

The 2,4-dimethyl-6-isobornylphenol fraction soon crystallized on standing at room temperature. After recrystallization from petroleum ether, the soft furry crystals had a melting point of 81.6 to 81.9° C.

The total yield of 2,4-dimethyl-6-isobornylphenol was 35 per cent of theory, based upon the total starting materials, or 89 per cent based upon unrecovered starting materials.

EXAMPLE 2

2,4-dimethyl-6-isobornylphenol

One hundred grams of 2,4-dimethylphenol containing 5 grams of concentrated sulfuric acid as catalyst were heated at 70–80° C. with stirring for ninety minutes; during the first thirty minutes, 125 grams of camphene were added in small amounts. The reaction mixture was washed, first with water, then with potassium carbonate solution. The oil layer was dried over anhydrous $K_2CO_3$, then distilled. After 56 grams of camphene fraction and 61 grams of 2,4-dimethylphenol fraction had been distilled, 64 grams of crude 2,4-dimethyl-6-isobornylphenol were obtained as a light yellow viscous liquid distilling in the range 105–163° C. at about 2 millimeters; the main portion distilled at 142–147° C. The product had $n_D^{27.5}$=1.5366; the yield was 30 per cent of the theoretical. Thirteen grams of residue remained in the still-pot.

EXAMPLE 3

2,4-di-sec-butyl-6-isobornylphenol

A mixture of 206 grams of 2,4-di-sec-butylphenol, 150 grams of camphene (10 per cent excess), and 7 grams of catalyst (boron trifluoride-ether complex) in 150 milliliters of toluene diluent was heated at 120–125° C. for 7 hours. Another 150 milliliters of toluene were added to the viscous dark brown reaction mixture to facilitate handling, and the mixture was washed twice with 10 percent NaOH solution. It then was distilled through a column having an efficiency of about five theoretical plates. After distillation of the solvent and 118 grams of low-boiling material containing about 74 grams of unreacted 2,4-di-sec-butylphenol (boiling point 144°/10 millimeters), there was obtained 196 grams (58 per cent yield) of product, 2,4-di-sec-butyl-6-isobornylphenol, a highly viscous yellow liquid which was collected at 180–205° C./3 millimeters, and which had the refractive index $n_D^{23}$=1.5195. Forty grams of solid resin remained in the still-pot.

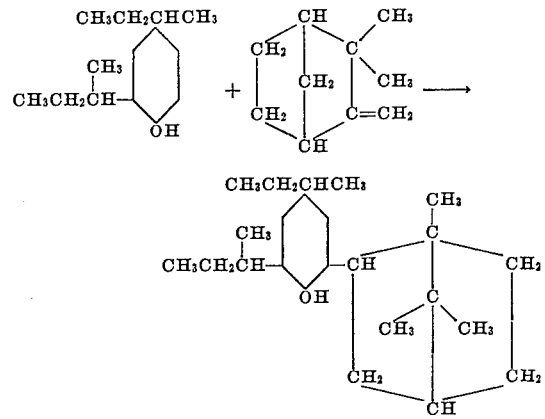

What I claim is:
1. 2,4-dialkyl-6-isobornylphenols.
2. 2,4-dimethyl-6-isobornylphenol.
3. 2,4-dibutyl-6-isobornylphenol.
4. 2,4-di-sec-butyl-6-isobornylphenol.

LELAND J. KITCHEN.

References Cited in the file of this patent

UNITED STATES PATENTS

| Number | Name | Date |
|---|---|---|
| 1,469,709 | Wuyts | Oct. 2, 1923 |
| 2,123,898 | Honel et al. | July 19, 1938 |
| 2,145,369 | Osterhof | Jan. 31, 1939 |
| 2,186,132 | Zink | Jan. 9, 1940 |
| 2,343,845 | Powers | Mar. 7, 1944 |
| 2,471,454 | Rummelsburg | May 31, 1949 |
| 2,537,636 | Kitchen | Jan. 9, 1951 |
| 2,537,647 | Kitchen | Jan. 9, 1951 |

FOREIGN PATENTS

| Number | Country | Date |
|---|---|---|
| 204,754 | Great Britain | Oct. 1, 1923 |
| 396,106 | Germany | May 30, 1924 |
| 598,298 | Germany | June 8, 1934 |

OTHER REFERENCES

Martin: Paint Manufacture, vol. 15, No. 2, pages 30–32, Feb. 1945.

Kitchen: Jour. Am. Chem. Soc., vol. 70, pages 3608–10, 1948.